United States Patent [19]

Kromrey

[11] Patent Number: 4,795,600

[45] Date of Patent: Jan. 3, 1989

[54] METHOD FOR MOLDING ARTICLES USING BARRIER COATINGS

[75] Inventor: Robert V. Kromrey, Campbell, Calif.

[73] Assignee: United Technologies Corporation, Hartford, Conn.

[21] Appl. No.: 930,621

[22] Filed: Nov. 14, 1986

[51] Int. Cl.$^4$ .................... B29C 43/10; B29C 43/18
[52] U.S. Cl. .................... 264/130; 264/79; 264/134; 264/257; 264/313; 264/334; 264/338; 427/154
[58] Field of Search .............. 264/257, 314, 316, 552, 264/546, 572, DIG. 50, 334, 295, 313, 325, 500, 544, 570, 241, 279, 300, 337, 338, 79, 129, 130, 134, 213; 425/78, 387.1, 405 H, 405 R, 407, DIG. 14, DIG. 44; 427/154, 155, 156, 386, 393.5, 385, 385.5, 389.8; 428/394, 389

[56] References Cited

U.S. PATENT DOCUMENTS

| | | | |
|---|---|---|---|
| 1,909,177 | 5/1933 | Honegger | 204/79 |
| 2,661,153 | 9/1952 | Semegen | 427/155 |
| 3,919,379 | 11/1975 | Smarook | 264/134 |
| 4,167,430 | 9/1979 | Arachi | 264/319 |
| 4,264,556 | 4/1981 | Kumar | 425/405 H |
| 4,351,880 | 9/1982 | Fukui et al. | 427/156 |
| 4,428,906 | 1/1984 | Rozmus | 425/405 H |
| 4,654,235 | 3/1987 | Effenberger | 427/389.8 |
| 4,656,002 | 4/1987 | Lizenby et al. | 425/405 R |

FOREIGN PATENT DOCUMENTS 2134168   5/1971   Fed. Rep. of Germany ...... 264/319

*Primary Examiner*—James Lowe
*Assistant Examiner*—Jeremiah F. Durkin, II
*Attorney, Agent, or Firm*—A. Dean Olson

[57] ABSTRACT

Barriers used for separating silicone pressurizing medium from articles during curing, thereby protecting the article from silicone contamination. A composite precursor is substantially encapsulated by a barrier coating that is capable of substantially separating the composite precursor from silicone polymers at elevated temperatures during curing. The barrier coating is also capable of being chemically removed from the composite precursor subsequent to its cure without substantially damaging the composite. Composites are molded by protecting a composite precursor from a silicone pressurizing medium during curing utilizing a barrier coating. The method comprises encapsulating a composite precursor with a coating that is substantially capable of separating the composite precursor from silicone polymers at elevated temperatures. The coating is also capable of being chemically removed from the composite without damaging the composite. The precursor is cured by causing a silicone polymer to apply pressure to the precursor and exposing the precursor to elevated temperatures. Then the coating is chemically removed from the composite.

9 Claims, No Drawings

METHOD FOR MOLDING ARTICLES USING BARRIER COATINGS

CROSS REFERENCE

This application relates to commonly assigned co-pending applications Ser. No. 829,048 filed Feb. 13, 1986, entitled "Molding Method and Apparatus Using a Solid, Flowable, Polymer Medium"; Ser. No. 907,942 entitled "Method for Molding a Carbon-Carbon Composite"; Ser. No. 907,943 entitled "Solid Flowable Polymer Molding Medium with Metal Additives and Method of Molding Using Same"; Ser, No. 907,946 entitled "High Temperature Solid Flowable Polymer Medium and Method of Molding Using Same"; Ser. No. 907,947 entitled "Method for Molding Using a Dual Solid Flowable Polymer System"; Ser. No. 907,952 entitled "Method for Recovering a Solid Flowable Polymer Medium"; Ser. No. 907,954, now U.S. Pat. No. 4,704,240 entitled "Improved Method of Fabricating Tubular Composite Structures; Ser. No. 907,955 entitled "Solid Flowable Medium Having a Thermal Stability Additive and Method for Molding Using Same"; Ser. No. 907,957 entitled "Solid Flowable Polymer Medium with U.V. Detectable Additive and Method for Molding Using Same", Ser. No. 907,958 entitled "Method of Vacuum Bagging Using a Solid Flowable Polymer" and Ser. No. 907,959 entitled "Solid Flowable Polymer Molding Medium" all filed on Sept. 10, 1986, which disclose material related to that contained herein, the disclosures of which are hereby incorporated by reeerence.

TECHNICAL FIELD

The field of art to which this invention pertains is article precursors and methods of molding and it is particularly adapted to composite prepregs and methods of molding the same.

BACKGROUND ART

Composite materials are of great current interest because they provide a very favorable combination of high strength and low density. Typically, a composite material is comprised of fibers of graphite, boron, glass, and the like embedded within an epoxy, phenolic or other polymer resin matrix. The more advanced composites which have particularly favorable high strength to density ratio properties are especially attractive for aerospace applications. But typical of other advanced aerospace materials they present comparative processing difficulties; they cannot be made by a simple layup of the fibers and resin followed by room temperature curing. Aerospace composite materials not only involve more difficult-to-fabricate resins but often essentially defect-free finished parts must be produced. As a result, aerospace composites are typically molded and cured at elevated temperatures under substantial pressure.

One method of molding (pressure pads) comprises using shaped pads of a high thermal expansion silicone rubber. An uncured prepreg is contained within a space between abutting adjacent pads and the assembly is captured in a closely fitting closed metal vessel. The vessel and contained assembly are then heated to an elevated temperature to both cure the article and expand the rubber to apply pressure to an article during its cure. The pressure pads are also referred to as trapped rubber tooling.

Although these pressure pads are an improvement, they can have disadvantages such as the application of uneven mold pressures at joints.

Accordingly, there has been continual search in this field of art for methods of molding composite articles.

DISCLOSURE OF INVENTION

The disclosure of this invention is directed to barriers used for separating silicone pressurizing medium from articles during curing, thereby protecting the article from silicone contamination. A composite precursor is substantially encapsulated by a barrier coating that is capable of substantially separating the composite precursor from silicone polymers at elevated temperatures during curing. The barrier coating is also capable of being chemically removed from the composite precursor subsequent to its cure without substantially damaging the composite.

Another aspect of this invention is directed to a method for molding a composite by protecting the composite precursor from a silicone pressurizing medium during curing utilizing a barrier coating. The method comprises encapsulating a composite precursor with a coating that is substantially capable of separating the composite precursor from silicone polymers at elevated temperatures. The coating is also capable of being chemically removed from the composite without damaging the composite. The precursor is cured by causing a silicone polymer to apply pressure to the precursor and exposing the precursor to elevated temperatures. Then the coating is chemically removed from the composite.

This invention provides barriers for composite articles that protect them from silicone pressurizing medium during curing. Thus, it makes a significant advance in the field of composite molding.

Other features and advantages will be apparent from the specification and claims and from the accompanying drawing which illustrates an embodiment of the invention.

BEST MODE FOR CARRYING OUT THE INVENTION

Generally, any article that needs to be cured (e.g., annealed, molded) may be advantageously coated and then processed according to this invention. However, this invention is particularly applicable to fiber reinforced composites because they typically require high temperatures and pressures for molding and curing. Fiber reinforced composites include chopped fiber, reinforced composites and fiber layup composites. Virtually any fiber can be used in these composites, the following being merely exemplary: glass, quartz, carbon and graphite. In a similar fashion virtually any resin can be used, the follownng being merely exemplary: epoxy, bismaleimide, polyimide and polybenzimidazole.

Generally, any shaped article may be coated according to this invention. However, this invention is advantageously used to mold intricately shaped articles. These shapes can include cantilevers, tubes, underhangs, and any of a variety of other shapes that are typically difficult to mold with conventional methods (e.g., vacuum bags).

Generally, any barrier coating that is capable of substantially separating the article precursor from silicone polymers at elevated temperatures during curing and is also capable of being chemically removed from the article precursor subsequent to cure without damaging the article may be used in this invention. By separating the article precursor from silicone polymers is meant not only protecting the article (e.g., composite prepreg) from a silicone pressurizing medium (described below) but also protecting that same silicone pressurizing medium from contamination by the article (e.g., resin). It is also preferred that the barrier coating is chemically stable during the cure temperatures. Barrier materials may include organic polymers which can undergo substantial thermal decomposition while maintaining effective barrier properties. Usually, by the time (highest temperature of cure) the barrier becomes brittle or porous, the resin in the article being molded has solidified. All compaction and movement will have taken place by this time, preventing loads on the barrier which otherwise could cause it to rupture. Such a barrier would be considered chemically stable at the cure temperatures used since it effectively separated the pressurizing medium from the article being molded. It is preferred that the barrier coating be as thin as possible while still able to provide the separation described above. This facilitates coating of the article as typically, the thinner the coating the better it is able to conform to the intricacies of an article and eliminate such phenomena as bridging encountered in conventional vacuum bag technology. Thus, it is preferred that the thickness of the coating is less than about 0.025 cm. It is especially preferred that the coating is about 0.0015 cm to about 0.01 cm in thickness. It is preferable that the barrier coating is a chemically dissolvable metal foil or polymer film because it may be bonded or mechanically attached to the molded surface. It is especially preferred that the barrier coating comprises aluminum alloys, chlorotrifluoroethylene or vinylidene fluoride polymers because they are effective chemical resistant barriers and can be easily dissolved and are effective separation barriers. Exemplary materials include conventional aluminum foil, KEL F-800 TM. chlorotrifluoroethylene vinylidene copolymer (3M Co., St. Paul, Minn.), KEL f-81 TM chlorotrifluoroethylene (3M Co.) and Vyton TM vinylidene fluoride (Du Pont De Nemours, Wilmington, Del.). However, TEFLON, for example, would be unsuitable as it is difficult to dissolve.

Generally, any chemical system may be used with this system that can remove substantially all of the barrier coating from the article (subsequent to its cure) and yet does not result in damage to the composite article. It is important that above 98% of the barrier coating is removed from the composite article. Below this amount, the residual coating material may deleteriously affect subsequent processing steps (e.g., bonding). It is also important that the chemical system does not adversely affect the surface of the article as this may also affect the subsequent processing steps. It is preferred that for metal foils, alkaline solutions are used. It is also preferred that no corrosion inhibitors are incuuded in the alkaline solution because they could retard the chemical action. It is preferred that alkylesters are used for dissolving the above-described chlorotrifluoroethylene and vinylidene fluorides. These systems readily dissolve the barrier coatings without affecting the composite articles. It is especially preferred that a mixture of tetra sodium pyrophosphate and trisodium phosphate with a suitable wetting agent such as alkyl aryl sulfonate, available from Wyandotte Chemical (Wyandotte, Mich.) is used to remove conventional aluminum foil because the high pH of the solution readily dissolves aluminum and its alloys and would not adversely affect a composite article. It is also especially preferred that an ethylacetate solution is used to dissolve the KEL F polymer because it has high solvency for the polymer film, is relatively safe and would not affect a composite article.

These barriers are useful in separating silicone-type polymers from composites. The silicone polymers are useful as a pressurizing medium as described in commonly assigned U.S. application Ser. No. 829,048 entitled "Molding Method and Apparatus Using a Solid, Flowable, Polymer Medium", the disclosure of which is hereby incorporated by reference. The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of $-4$ to $+30$ U.S. mesh sieve size (4.7–0.42 millimeter (mm)), which when pressurized, is sufficiently self-compliant to coalesce as an essentially void-free medium at a pressureoof the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethllsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn. USA), believed to be essentially the material which is described in the Bruner U.S. Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g. 316° C. (600° F.), 482° C. (900° F.)).

Most silicone rubbers are temperature limited for long term use, e.g. typically up to about 232° C. (450° F.). However, silicone resins of the vinlymethylsiloxane and silphenylene types have been successfully tested up to about 482° C. (900° F.). Fillers and other adulterants (such as the metal particulates described below) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 6360 material without the metal additive will tend to coalesce upon the application of moderate compressive pressure, of the order of 70 kPa; at this point the interfacial boundaries between the particles are so essentially conformed that the coppresed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with mediums having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition o molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer has only been characterized according to the properties of some currently available materials; the data are insufficient to establish that the totality of measured properties in combination aee necessary. On the contrary, to a significant extent it is believed there is a redundancy and that they independently characterize the invention.

These coatings are used in a method of molding which comprises coating an article precursor with a barrier coating, curing (annealing, etc.) the article precursor and chemically removing the barrier coating. More specifically, the article precursor may be wrapped in the metal foil or plastic film. The excess material can be trimmed and the butt joints sealed with a conventional tape such as masking tape (3M Co., Minn.) as this simplifies the application of a smooth layer. Alternatively, the coating may be applied to the article by melting it onto the composite article, curing it on the composite article or spraying it on the article.

Then the article precursor is cured or annealed by causing the silicone polymer described above to apply pressure to the article precursor. These pressures are typically about 0.01 MPa (15 psi) to about 21 MPa (3000 psi) and even higher. However, they vary depending upon the particular article to be cured its composition, size and any elevated temperatures it is exposed to while curing. Optionally, the article precusor is exposed to elevated temperatures at about 121° C. (250° F.) to about 468° C. (875° F.) and even higher in order to cure the article precursor. As with the pressures these temperatures vary depending upon the particular article to be cured, the size and shape of the article and the pressures that it is exposed to.

The coating is then removed chemically by exposure, for example, to alkaline solution or an organic solvent. The exposure times vary depending upon the particular solvent, barrier coating, and temperature. Typically, for a high pH alkaline solution, removal of aluminum foil takes about 0.5 to about 3 minutes at about 20° C. to about 60° C. Also, for the preferred KEL F-800 polymer film, exposure, with surface agitation, to an ethyl acetate solution for about 15 minutes to about 60 minutes at about 20° C. to about 35° C. is typically sufficient to remove the polymer film. For the above examples, exposure for longer periods of time at higher temperatures may damage the composite article, however, substantially all the barrier coating may not be removed if the minimum exposure times are not achieved.

EXAMPLE

An article to be cured is laid-up using a graphite fabric reinforced bismaleimide resin. The laminate is composed of 35 layers of prepreg material and installed on a suitable mold plate. A layer of 0.0018 cm (0.0007 inch) thick aluminum foil is then placed over the billet, entirely covering the composite and has an excess of about 1.27 cm (0.5 inch) over the plate. The foil is firmly pressed to cause it to conform to the billet surfaces. Masking tape is then applied to the margin to hold it in place until the assembly is pressurized, The pressurizing medium is caused to apply pressure to the article, either by thermal expansion of the medium or by secondary application through a vacuum bag. Vacuum bag pressurization is accomplished with an autoclave.

The article is then cured at 191° C. (375° F.) for two hours under 1.38 MPa (200 psi) in an autoclave or at 6.89 MPa (1000 psi) if directly pressurized with powdered medium.

On removal from the pressure vessel, the medium is removed from the surface of the barrier. The article is then immersed in a hot solution 60° C. (140° F.) containing 14.9 grams/liter (2 oz/gallon) tetrasodium pyrophosphate, 14.9 grams/liter (2 oz/gallon) trisodium phosphate, and 7.9 grams/liter (0.25 oz/gallon) surfactant. The part is removed and rinsed in cool, clear water after the violent bubbling ceases. Then the part is dried in an air circulating oven at 107° C. (225° F.) for 4 hours.

These barrier coatings provide effective prevention of contamination of composite surfaces. At the same time, they act to prevent contamination of silicone pressurizing media by the resin rendering it less effective as a pressurizing medium. When silicone pressurizing media is used to mold articles, it can leave a residue on the article if the silicone is used in direct contact with the article. This can result in lesser bond strengths when the articles are subsequently bonded to other articles. Further, the silicone contamination of articles can be difficult to remove since under high pressures, the flowable silicone pressurizing media will tend to conform to the surface of a fabric prepreg. The silicone can ente into the fabric weave resulting in some intrusion into the first layer. Then resin from the prepreg can flow over, and trap, a portion of the medium that has entered this surface. This could necessitate a mechanical action removal means in order to dislodge the embedded material. In contrast, the coatings and process of this invention provide a simple and effective solution. In addition, these coatings can act to confine any condensation products and duct them out of the pressure vessel as described in copending commonly assigned U.S. application Ser. No. 907,946 entitled "High Temperature Solid Flowable Polymer Medium and Method of Molding Using Same", the disclosure of which is hereby incorporated by reference. Finally, these thin barriers act to minimize wrinkling of the material being molded, while improving the surface finish of the part.

Thus, these coatings and methods make a significant advance to the field of molding articles by providing separation barriers for use with silicone pressurizing media.

It should be understood that the invention is not limited to the particular embodiments shown and described herein, but that various changes and modifications may be made without departing from the spirit and scope of this novel concept as defined by the following claims.

I claim:

1. A method for molding a composite precursor to form a composite comprising
    (a) encapsulating said composite precursor with a chemically dissolvable metal foil coating that
        (i) is substantially capable of separating said composite precursor from particulate silicone at elevated temperatures; and
        (ii) is capable of being chemically removed from said composite without damaging said composite;
    (b) curing said precursor by causing said particulate silicone to apply pressure through said foil to said precursor and exposing said precursor to elevated temperatures; and
    (c) chemically removing said coating from said composite;
whereby said composite precursor is protected from silicone contamination during curing.

2. The method as recited in claim 1 wherein said coating comprises aluminum alloys .

3. The method as recited in claim 2 wherein said coating is chemically removed with a mixture comprising tetrasodium pyrophosphate, trisodium phosphate and a suitable wetting agent.

4. The method as recited in claim 2 wherein said composite precursor is wrapped in said metal foil and sealed with conventional tape.

5. The method as recited in claim 2 wherein said metal foil is less than about 0.25 cm thick.

6. The method as recited in claim 2 wherein said metal foil is about 0.0015 cm to about 0.01 cm in thickness.

7. The method as recited in claim 5 wherein said particulate silicone polymer and said foil covered composite precursor are disposed in a pressure vessel and said foil confines any condensation products and ducts said condensation products out of said pressure vessel.

8. The method as recited in claim 6 wherein said particulate silicone polymer and said foil covered composite precursor are disposed in a pressure vessel and said foil confines any condensation products and ducts said condensation products out of said pressure vessel.

9. The method as recited in claim 4 wherein said particulate silicone polymer and said foil covered composite precursor are disposed in a pressure vessel and said foil confines any condensation products and ducts said condensation products out of said pressure vessel.

* * * * *